(12) United States Patent
Galstad (10) Patent No.: US 10,479,437 B2
(45) Date of Patent: Nov. 19, 2019

(54) ACCESSORY STEM

(71) Applicant: Trek Bicycle Corporation, Waterloo, WI (US)

(72) Inventor: Ryan Galstad, Lake Mills, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 0 days.

(21) Appl. No.: 16/423,996

(22) Filed: May 28, 2019

(65) Prior Publication Data

US 2019/0276109 A1 Sep. 12, 2019

Related U.S. Application Data

(63) Continuation of application No. 14/103,538, filed on Dec. 11, 2013.

(60) Provisional application No. 61/735,678, filed on Dec. 11, 2012.

(51) Int. Cl.
*B62K 21/12* (2006.01)
*B62K 19/40* (2006.01)
*B62J 99/00* (2009.01)

(52) U.S. Cl.
CPC .............. *B62K 21/12* (2013.01); *B62K 19/40* (2013.01); *B62J 2099/0033* (2013.01); *Y10T 74/20822* (2015.01)

(58) Field of Classification Search
CPC ....... Y10T 74/20786–20798; Y10T 74/20822; B62K 19/30; B62K 19/32; B62K 19/40; B62K 21/12–24; B62J 2099/0026; B62J 2099/0033; B62J 6/02; B62J 7/06; B62J 9/003; B62J 11/00
See application file for complete search history.

(56) References Cited

U.S. PATENT DOCUMENTS

| | | | |
|---|---|---|---|
| 8,020,884 B1* | 9/2011 | Foley ..................... | B62K 21/12 280/279 |
| 8,177,249 B2* | 5/2012 | Servet ..................... | B62K 21/16 280/279 |
| 2004/0112168 A1* | 6/2004 | Alley ..................... | B62K 21/12 74/551.8 |
| 2006/0002119 A1* | 1/2006 | Sharp ....................... | B62J 6/003 362/473 |
| 2010/0059638 A1* | 3/2010 | Taiga ....................... | B62J 11/00 248/124.1 |
| 2010/0282017 A1* | 11/2010 | Hermansen ........... | B60B 27/026 74/551.3 |
| 2010/0313702 A1* | 12/2010 | Uimonen ............... | B62K 21/16 74/551.5 |
| 2013/0248569 A1* | 9/2013 | Hsu .......................... | B62J 11/00 224/440 |

* cited by examiner

*Primary Examiner* — Richard W Ridley
*Assistant Examiner* — Brian J McGovern
(74) *Attorney, Agent, or Firm* — Bell & Manning, LLC (57) ABSTRACT

An apparatus for a bicycle including a stem body and a mount. The stem body can include at least one handlebar clamping surface and at least one mount clamping surface. The mount can include a first clamping surface. The first clamping surface can be configured to match at least one mount clamping surface. The mount can be configured to clamp between the stem body and a handlebar.

20 Claims, 7 Drawing Sheets

FIG. 13

ACCESSORY STEM

CROSS-REFERENCE TO RELATED PATENT APPLICATIONS

This application is a continuation application of U.S. patent application Ser. No. 14/103,538, filed Dec. 11, 2013, which claims the benefit of U.S. Provisional Application No. 61/735,678, filed Dec. 11, 2012, titled "ACCESSORY STEM," which are incorporated herein by reference in their entireties.

BACKGROUND

The present invention relates generally to the field of accessory stems and more particularly to the field of modular accessory stems.

Bicycle users typically desire to secure accessories to their bicycle such as lights, bicycle computers, mobile phones, etc. Typically, an accessory can be attached to a handlebar of the bicycle using a clamping mechanism that surrounds and presses against the outside of the handlebar. Clamps can be unsightly and mar the surface of the handlebar. Therefore, improved apparatuses and methods of securing accessories to a bicycle are needed.

SUMMARY

One illustrative embodiment is directed to an apparatus for a bicycle including a stem body and a mount. The stem body can include at least one handlebar clamping surface and at least one mount clamping surface. The mount can include a first clamping surface. The first clamping surface can be configured to match at least one mount clamping surface. The mount can be configured clamp between the stem body and a handlebar.

Another illustrative embodiment is directed to an apparatus for a bicycle including a stem body and a mount. The stem body can include a cavity and at least one handlebar clamping surface. An opening of the cavity can include at least one mount clamping surface. The mount can' include a first clamping surface and a second clamping surface. The first clamping surface can be configured to match at least one mount clamping surface and the second clamping surface can be configured to match at least one mount clamping surface.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE ILLUSTRATIVE EMBODIMENTS

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 1:
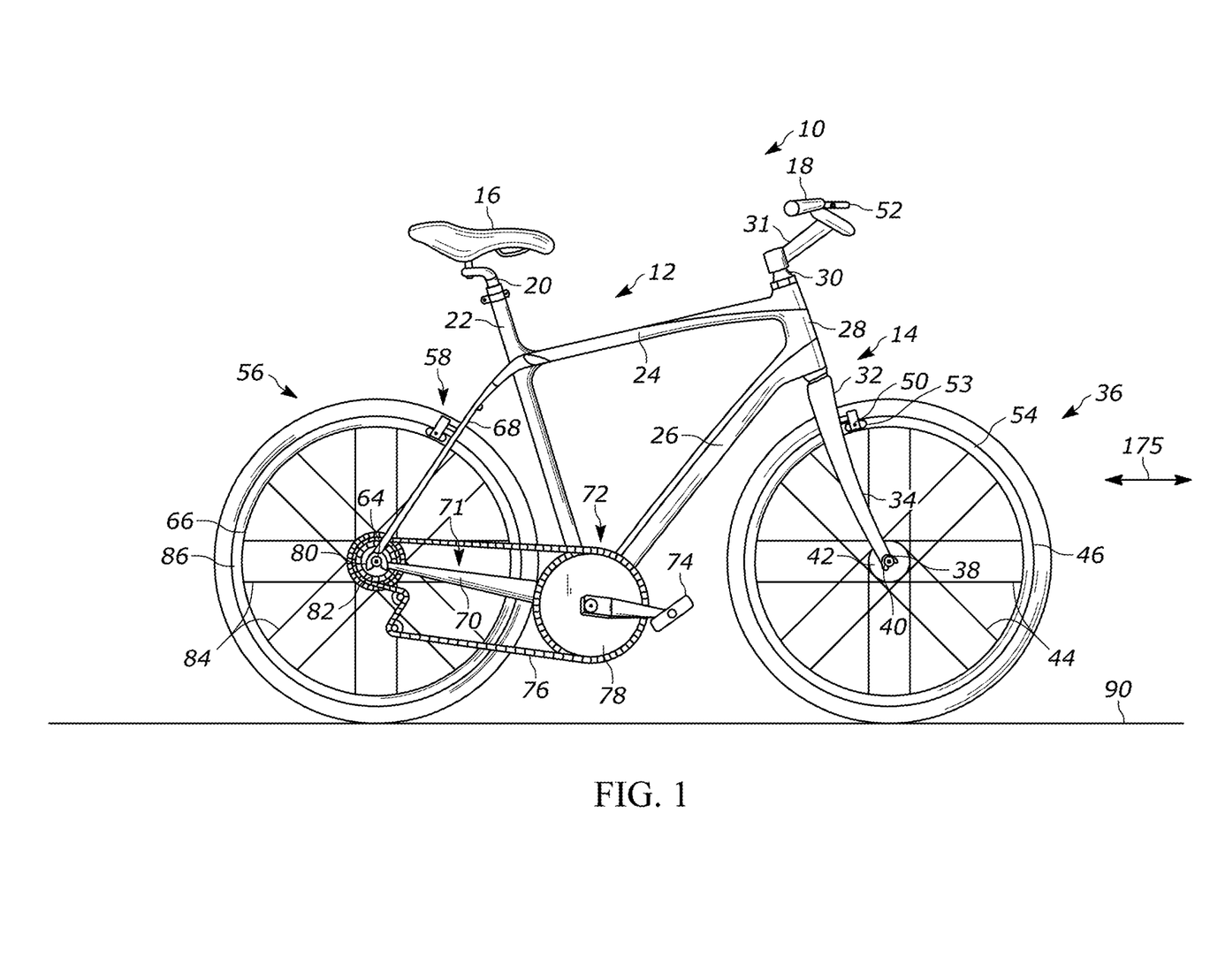
FIG. 1 is a side view of a bicycle in accordance with an illustrative embodiment.

The present disclosure is directed to an accessory stem and method of attaching accessories to a stem. Referring to FIG. 1, a side view of a bicycle 10 in accordance with an illustrative embodiment is shown. The bicycle 10 can have a frame assembly 12. The bicycle 10 can include a seat 16 and handlebars 18 that are attached to frame assembly 12. A seat post 20 can be connected to seat 16 and can slidably engage a seat tube 22 of the frame assembly 12. A top tube 24 and a down tube 26 can extend forwardly from the seat tube 22 to a head tube 28 of the frame 12. Handlebars 18 can be connected to steer tube 30 by a stem 31. The steer tube 30 can pass through the head tube 28 and can be connected or integrally formed with a fork crown 32. The handlebar 18 can include a stem that is constructed to slidably engage an interior cavity of the steer tube 30. One or more of the structures of bicycle 10 and frame assembly 12 can be constructed from similar materials, a variety of different materials, and various combinations thereof. The frame assembly 12 and seat tube 22 can be formed of metal-type materials, such as steel, aluminum-type materials, fiber reinforced plastic, carbon fiber materials, and/or materials that are sufficiently formable and robust enough to support a rider of bicycle 10.

A fork assembly 14 can include a pair of fork blades or fork legs 34 that can extend from generally opposite ends of a fork crown 32 and can be constructed to support a front wheel assembly 36 at an end thereof or a dropout 38. The dropouts 38 can engage generally opposite sides of an axle 40 constructed to engage a hub 42 of the front wheel assembly 36. A number of spokes 44 can extend from hub 42 to a rim 46 of the front wheel assembly 36. A tire 48 can be engaged with rim 46 such that rotation of the hub 42 and the rim 46, relative to the fork legs 34, rotates the tire 48. The rim 46 can be covered with a brake material, in part or in its entirety, to enhance braking characteristics.

The bicycle 10 can include a front brake assembly 50 having an actuator 52 attached to handlebars 18 and a pair of brake pads 53 positioned on generally opposite sides of front wheel assembly 36. The brake pads 53 can be constructed to engage a brake wall 54 of the rim 46 thereby providing a stopping or slowing force to front wheel assembly 36. A rear wheel assembly 56 can include a brake assembly 58 similar to the front wheel brake assembly 50. Brake assemblies 50, 58 can be any brake configuration such as, but not limited to, a rim brake or disk brake assembly wherein a rotor and a caliper are positioned proximate one or more of front wheel axle 40 or a rear axle 64, respectively. The rotor can be covered with a brake material, in part or in its entirety, to enhance braking characteristics. A rear wheel 66 can be positioned generally concentrically about rear axle 64.

A pair of seat stays 68 (FIG. 2) and a pair of chain stays 70, 71 can extend rearward relative to the seat tube 22 and the offset rear axle 64 from a crankset 72. The crank set 72 can include a set of pedals 74 that can be operationally connected to a flexible drive member such as a chain 76 via one or more variable diameter chain gears or a chain ring or sprocket 78. Rotation of chain 76 can communicate a drive force to a gear cluster 80 positioned proximate rear axle 64. The gear cluster 80 can be generally concentrically orientated with respect to the rear axle 64 and can include a number of variable diameter gears.

The gear cluster 80 can be operationally connected to a hub 82 of the rear wheel 66. A number of spokes 84 can extend radially between the hub 82 and a rim 86 of rear wheel 66 of rear wheel assembly 56. The rim 86 can be covered with a brake material. Rider operation of the pedals 74 can drive the chain 76 thereby driving the rear wheel 66 which in turn propels the bicycle 10. The fork assembly 14 can be constructed to support a forward end 88 of the bicycle 10 above a ground surface 90. The handlebar 18 can be connected to the frame 12 and the fork assembly 14 such that operator manipulation of the handlebar 18 can be communicated to the fork assembly 14 to facilitate rotation of the front wheel assembly 36 relative to the frame assembly 12 along a longitudinal axis, indicated by arrow 175, of the bicycle 10. Manipulation of the handlebar 18 can steer the bicycle 10 during riding.

The construction of bicycle 10 depicted in FIG. 1 is merely exemplary of a number of bicycle configurations. Whereas bicycle 10 is shown as what is commonly understood as a street or road bike, the present disclosure is applicable to a number of bicycle configurations including those bicycles with more aggression suspension systems commonly found in off-road or mountain bike frame configurations, and/or hybrids, cyclo-cross, cross-over or multi-purpose bicycle frame configurations.

Figure 2:
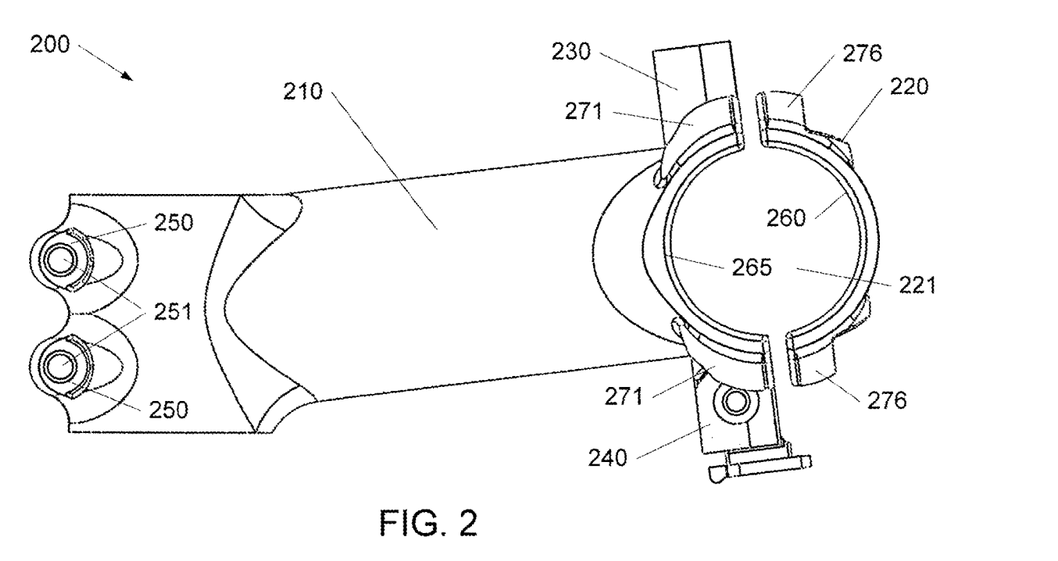
FIG. 2 is a side view of a stem in accordance with an illustrative embodiment.
Figure 3:
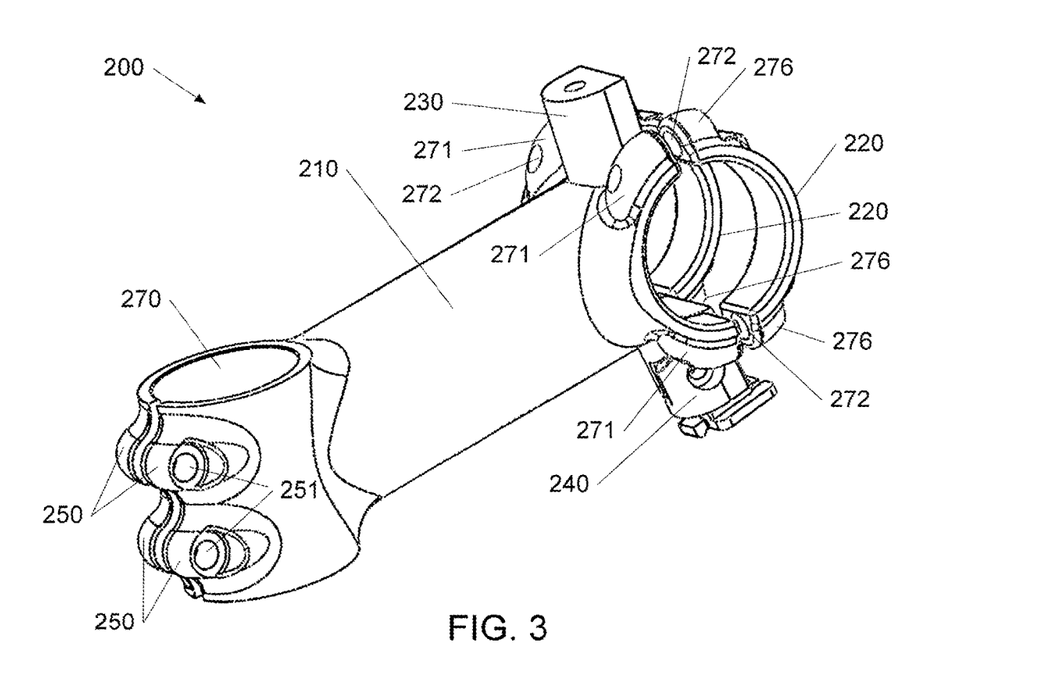
FIG. 3 is a perspective view of the stem of FIG. 2 in accordance with an illustrative embodiment.

Referring to FIG. 2, a side view of a stem 200 in accordance with an illustrative embodiment is shown. Referring to FIG. 3, a perspective view of the stem 200 of FIG. 2 in accordance with an illustrative embodiment is shown. The stem 200 can include a stem body 210, faceplates 220, a first mount 230, and a second mount 240. The stem body 210, the faceplates 220, the first mount 230, and the second mount 240 can be made of aluminum, steel, plastic or any other material. The faceplates 220 can be multiple faceplates or a single faceplate. The stem body 210 and the faceplates 220 can be configured to form an opening 221 for securing a handlebar (not shown; for example, element 18 in FIG. 1). The opening 221 can be circular, oval, or any other shape.

In one embodiment, the stem body 210 and the faceplates 220 can be made of a first material that is rigid; and the first mount 230 and the second mount 240 can be made of a second material that compresses or elastically deforms relative to the first material. The handlebar can also be rigid. For example, the stem body 210 and the faceplates 220 (as well as the handlebar) can be made of an aluminum alloy and the first mount 230 and the second mount 240 can be made of a glass filled nylon or plastic which can compress against the aluminum alloy. In another embodiment, a portion of the first mount 230 and the second mount 240 can include a relatively compressible material (for example, a flange of the mount can be co-molded nylon or rubber; or the flange can include a gasket). In one embodiment, the stem body 210 and the faceplates 220 can have a bulk modulus greater than 50 GPa and the first mount 230 and the second mount 240 can have a bulk modulus less than 50 GPa.

The stem body 210 can include a cavity (not shown). In one embodiment, the stem body 210 can be a tube shape with a diameter of about 15 mm to 50 mm and a length of about 50 mm to 300 mm; however, any length, width, depth and shape are possible. The stem body 210 can include a steering tube clamping surface 270 and steer tube clamping bosses 250. The steering tube clamping surface 270 can be configured to clamp to a steer tube of a bike. The steer tube clamping bosses 250 can include holes 251 for fasteners, for example, a bolt. When the fasteners are tightened, the steer tube clamping bosses 250 can be drawn together such that the steering tube clamping surface 270 clamps to the steer tube of the bike.

The stem body 210 can include first handlebar clamping surfaces 265 and first handlebar clamping bosses 271. The faceplates 220 can include second handlebar clamping surfaces 260 and second handlebar clamping bosses 276. The first handlebar clamping surfaces 265 and the second handlebar clamping surfaces 260 can be configured to clamp to a handlebar of a bike. The first handlebar clamping bosses 271 and the second handlebar clamping surfaces 260 can include holes 272 for fasteners, for example, a bolt. When the fasteners are tightened, the first handlebar clamping bosses 271 and the second handlebar clamping bosses 276 can be drawn together such that the first handlebar clamping surfaces 265 and the second handlebar clamping surfaces 260 clamp to the handlebar of the bike.

The first mount 230 can be configured to support a first accessory (not shown). In one embodiment, the first mount 230 can be a universal mount. The second mount 240 can be configured to support a second accessory (not shown). In one embodiment, the first mount 230 can be a light mount. The first accessory and the second accessory can be, for example, a light, a bike computer, a mobile phone, or any other accessory. The first mount 230 and the second mount 240 can include adaptors for mounting any accessory.

The first mount 230 and the second mount 240 can be separate from the stem body 210. In one embodiment, the first mount 230 and the second mount 240 can be manipulated independently. The first mount 230 and the second mount 240 can be configured in multiple positions to change the functionality of the first mount 230 and the second mount 240. In one embodiment, the first mount 230 and the second mount 240 can each be separately configured in two distinct positions. In other embodiments, the first mount 230 and the second mount 240 can each be configured in multiple distinct positions. Further, the first mount 230 and the second mount 240 can each include multiple mounting surfaces that are exposed based on the distinct position of the first mount 230 and the second mount 240.

In one embodiment, in a first position (shown), the first mount 230 can be configured to nest between at least the first handlebar clamping surfaces 265 and extend outward (e.g., upward) so that an accessory can be attached to the first mount 230. In the first position, when the fasteners are tightened, the first handlebar clamping bosses 271 and the second handlebar clamping bosses 276 can be drawn together such that the first mount 230 is secured between the stem body 210 and the handlebar.

In a second position (not shown), the first mount 230 can be configured to nest inside the stem body 210. Thus, the first mount 230 does not extend from the stem body 210. In one embodiment, an exposed portion of the first mount 230 in the second position forms a continuous surface with the stem body 210. Thus, the first mount 230 is stowed in the stem body 210.

In a third position (shown), the second mount 240 can be configured to nest between at least the first handlebar clamping surfaces 265 and extend outward (e.g., downward) so that an accessory can be attached to the second mount 240. In the third position, when the fasteners are tightened, the first handlebar clamping bosses 271 and the second handlebar clamping bosses 276 can be drawn together such that the second mount 240 is secured between the stem body 210 and the handlebar.

In a fourth position (not shown), the second mount 240 can be configured to nest inside the stem body 210. Thus, the second mount 240 does not extend from the stem body 210. In one embodiment, an exposed portion of the second mount 240 in the fourth position forms a continuous surface with the stem body 210. Thus, the second mount 240 is stowed in the stem body 210.

Advantageously, the first mount 230 and the second mount 240 can be configured match user needs. Advantageously, the first mount 230 and the second mount 240 can be stowed in the stem body 210 when not needed.

In alternative embodiments, the stem can be adapted to other mounting situations. For example, the clamping collar for a seat post can include clamping surfaces for clamping a mount to a seat post of seat tube. In another alternative embodiment, a ring for mounting accessories in general can include clamping surfaces for clamping a mount to a general tube of a bike. For example, the ring could be used to mount an accessory near an end of a handlebar.

Figure 4:
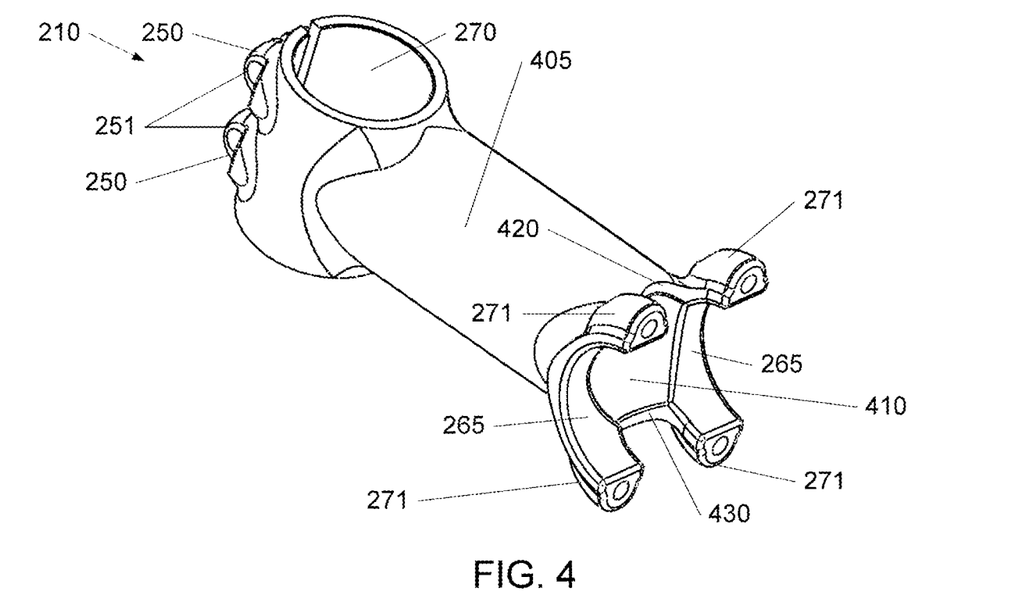
FIG. 4 is a first perspective view of the stem body of FIG. 2 in accordance with an illustrative embodiment.
Figure 5:
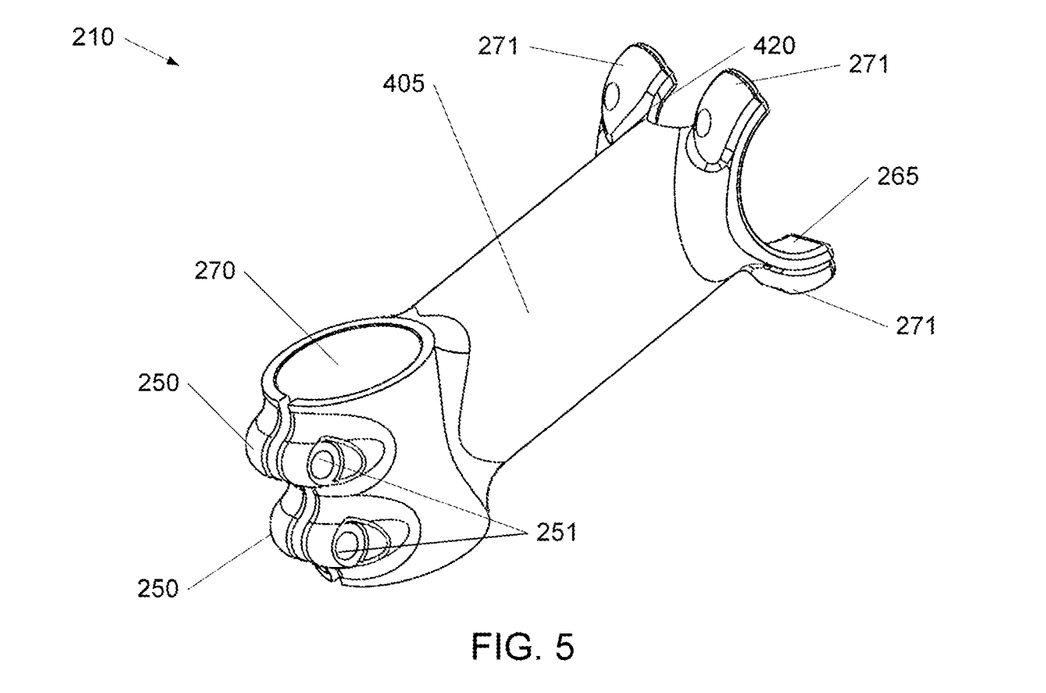
FIG. 5 is a second perspective view of the stem body of FIG. 2 in accordance with an illustrative embodiment.
Figure 11:
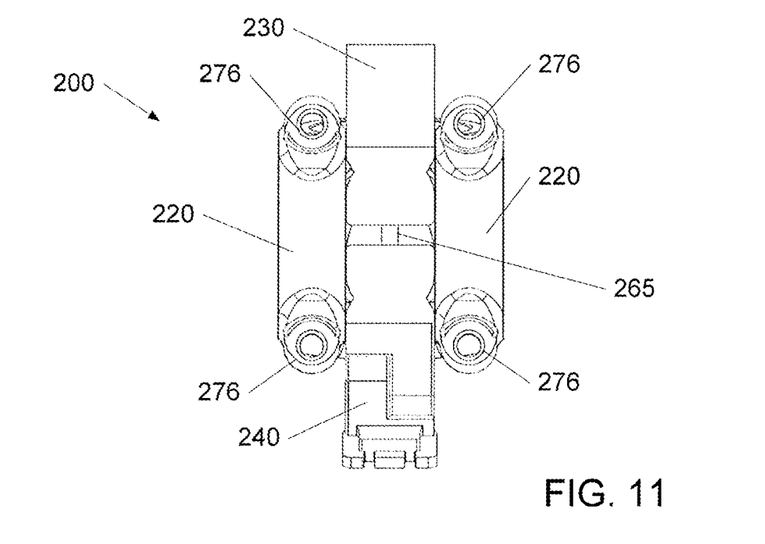
FIG. 11 is a front view of the stem body of FIG. 2 in accordance with an illustrative embodiment.

Referring to FIG. 4, a first perspective view of the stem body 210 of FIG. 2 in accordance with an illustrative embodiment is shown. Referring to FIG. 5, a second perspective view of the stem body 210 of FIG. 2 in accordance with an illustrative embodiment is shown. Referring to FIG. 11, a front view of the stem body of FIG. 2 in accordance with an illustrative embodiment is shown. As described above, the stem body 210 can include the steering tube clamping surface 270, steer tube clamping bosses 250, first handlebar clamping surfaces 265, and first handlebar clamping bosses 271.

The stem body 210 can include stem chassis 405 and a cavity 410. The cavity 410 can be configured to hold the first mount 230 and the second mount 240 in the second and fourth positions, respectively. The stem body 210 can include a first mount clamping surface 420 and a second mount clamping surface 430.

The first mount clamping surface 420 can be configured to cooperate with the first mount 230 to enhance clamping of the first mount 230 between the stem body 210 and the handlebar. The first mount clamping surface 420 can be located on a top lip of the stem body 210 between the first handlebar clamping surfaces 265 and first handlebar clamping bosses 271. In one embodiment, the first mount clamping surface 420 can have a crescent shape, however, the first mount clamping surface 420 can have a rectangular shape or any other shape. The first mount clamping surface 420 can also include a rabbet, a tongue, a groove, a filet, a chamfer, or key.

The second mount clamping surface 430 can be configured to cooperate with the second mount 240 to enhance clamping of the second mount 240 between the stem body 210 and the handlebar. The second mount clamping surface 430 can be located on a bottom lip of the stem body 210 between the first handlebar clamping surfaces 265 and first handlebar clamping bosses 271. In one embodiment, the second mount clamping surface 430 can have a crescent shape, however, the second mount clamping surface 430 can have a rectangular shape or any other shape. The second mount clamping surface 430 can also include a rabbet, a tongue, a groove, a filet, a chamfer, or key.

Figure 6:
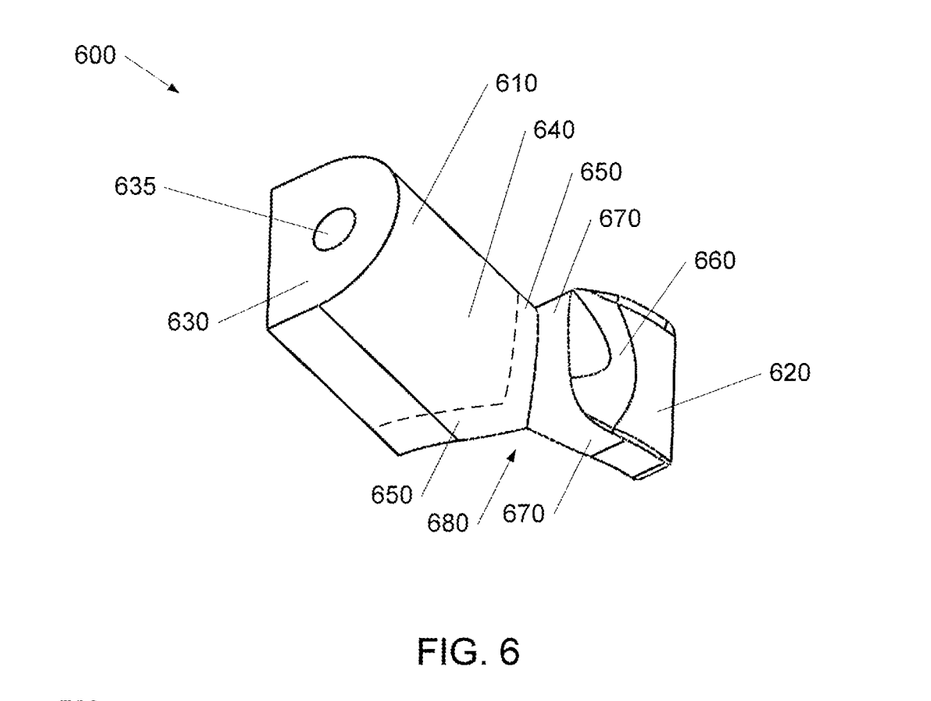
FIG. 6 is a perspective view of a universal mount in accordance with an illustrative embodiment.

Referring to FIG. 6, a perspective view of a universal mount 600 in accordance with an illustrative embodiment is shown. The universal mount 600 can include a first portion 610, a second portion 620, and a handlebar surface 680. In a first position, the first portion 610 can be deployed or extend out for use; and the second portion 620 can be nested in a stem tube. In a second position, the first portion 610 can be nested or hidden; the second portion 620 can be exposed.

The first portion 610 can include an extension portion 640, a mounting surface 630, a threaded hole 635, and a deployed clamping surface 650. An accessory or accessory plate can be attached to the mounting surface 630. For example, a fastener in the threaded hole 635 can be used to secure an accessory plate to the mounting surface 630.

The deployed clamping surface 650 can be configured to match or fit into a mount clamping surface (e.g., element 420, 430), partially or entirely. When the universal mount 600 is in a deployed position, the deployed clamping surface 650 can be mated with the mount clamping surface (e.g., element 420, 430). When the universal mount 600 is in a hidden position, the first portion 610 can be stowed in a cavity of a stem body (e.g., element 410).

The second portion 620 can include a stem tube matching portion 660 and a hidden clamping surface 670. The stem tube matching portion 660 can be configured to match the contours of a stem body (e.g., element 210). For example, a surface of the stem tube matching portion 660 can flow into a surface of the stem body (e.g., element 210). The hidden clamping surface 670 can be configured to match or fit into the mount clamping surface (e.g., element 420, 430), partially or entirely. When the universal mount 600 is in a hidden position, the hidden clamping surface 670 can be mated with the mount clamping surface (e.g., element 420, 430). When the universal mount 600 is in a deployed position, the second portion 620 can be stowed in the stem body (e.g., element 210).

The handlebar surface 680 can be configured to match a surface of a handle bar in both the deployed position and the hidden position. When the universal mount 600 is in a deployed position, the handlebar surface 680 can be pressed against the handlebar by the stem body (e.g., element 210) via the deployed clamping surface 650. When the universal mount 600 is in a hidden position, the handlebar surface 680 can be pressed against the handlebar by the stem body (e.g., element 210) via the hidden clamping surface 670. The universal mount 600 can be reconfigured from a deployed to a hidden position and vice versa.

Figure 7:
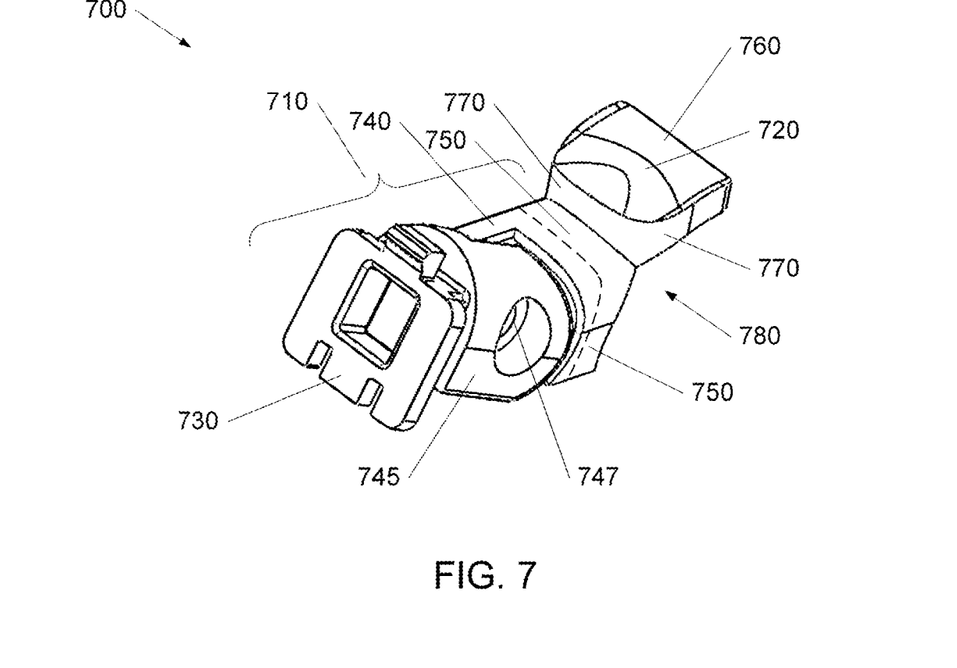
FIG. 7 is a perspective view of a flange mount in accordance with an illustrative embodiment.

Referring to FIG. 7, a perspective view of a flange mount 700 in accordance with an illustrative embodiment is shown. The flange mount 700 can include a first portion 710, a second portion 720, and a handlebar surface 780. In a first position, the first portion 710 can be deployed or extend out for use; and the second portion 720 can be nested in a stem tube. In a second position, the first portion 710 can be nested or hidden; and the second portion 720 can be exposed.

The first portion 710 can include a base portion 740, a pivoting portion 745, a pivot point 747, a mounting flange 730, and a deployed clamping surface 750. An accessory, such as a light, can be attached to or slid over the mounting flange 730. For example, a light module with a cleat can be slid onto the mounting flange 730. The base portion 740 and the pivoting portion 745 can be connected together by the pivot point 747. The pivot point 747 allows the pivoting portion 745 to be adjusted relative to the base portion 740.

The deployed clamping surface 750 can be configured to match or fit into a mount clamping surface (e.g., element 430), partially or entirely. When the flange mount 700 is in a deployed position, the deployed clamping surface 750 can be mated with the mount clamping surface (e.g., element 430). When the flange mount 700 is in a hidden position, the first portion 710 can be stowed in a stem body (e.g., element 210).

The second portion 720 can include a stem tube matching portion 760 and a hidden clamping surface 770. The stem tube matching portion 760 can be configured to match the contours of a stem body (e.g., element 210). For example, a surface of the stem tube matching portion 760 can flow into a surface of the stem body (e.g., element 210). The hidden clamping surface 770 can be configured to match or fit into the first mount clamping surface (e.g., element 420, 430), partially or entirely. When the flange mount 700 is in a hidden position, the hidden clamping surface 770 can be mated with the mount clamping surface (e.g., element 420, 430). When the flange mount 700 is in a hidden position, the second portion 720 can be exposed.

The handlebar surface 780 can be configured to match a surface of a handle bar in both the deployed position and the hidden position. When the flange mount 700 is in a deployed position, the handlebar surface 780 can be pressed against the handlebar by the stem body (e.g., element 210) via the deployed clamping surface 750. When the flange mount 700 is in a hidden position, the handlebar surface 780 can be pressed against the handlebar by the stem body (e.g., element 210) via the hidden clamping surface 770. The flange mount 700 can be reconfigured from a deployed to a hidden position and vice versa.

Figure 8:
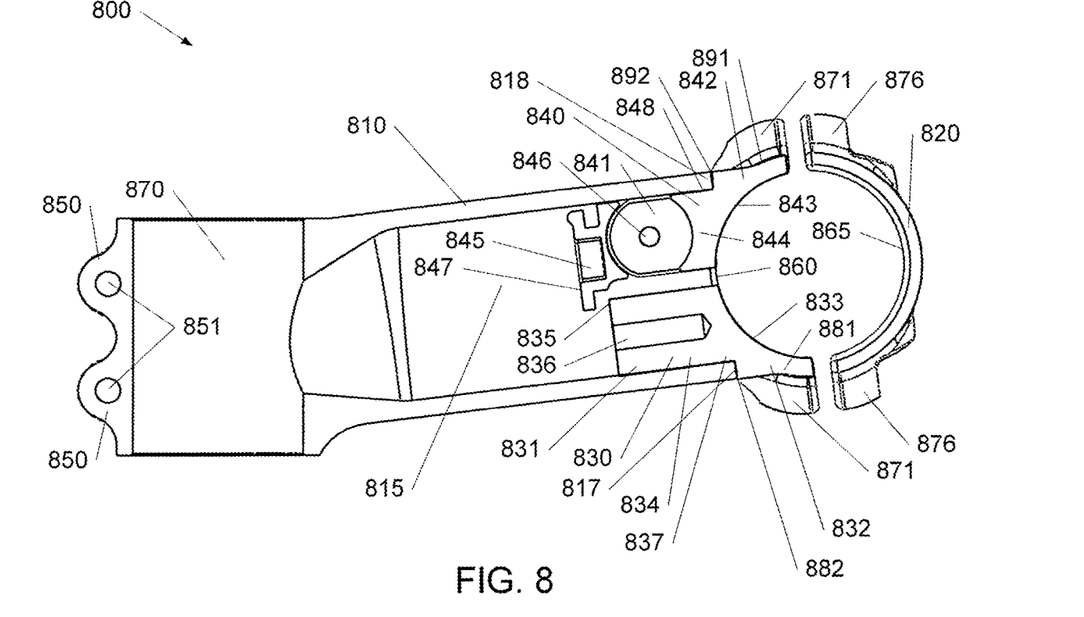
FIG. 8 is a side section view of a stem in a hidden configuration in accordance with an illustrative embodiment.

Referring to FIG. 8, a side section view of a stem in a hidden configuration 800 in accordance with an illustrative embodiment is shown. As described above, the stem 800 can include a stem body 810, faceplates 820, a first mount 830, and a second mount 840. The stem body 810 can include a cavity 815. The stem body 810 can include a steering tube clamping surface 870 and steer tube clamping bosses 850 with holes 851. The stem body 810 can include a first mount clamping surface 817 and a second mount clamping surface 818.

The stem body 810 can include first handlebar clamping surfaces 860 and first handlebar clamping bosses 871. The faceplates 820 can include second handlebar clamping surfaces 865 and second handlebar clamping bosses 876. The first handlebar clamping surfaces 860 and the second handlebar clamping surfaces 865 can be configured to clamp to a handlebar of a bike. The first handlebar clamping bosses 871 and the second handlebar clamping surfaces 865 can include holes for fasteners, for example, a bolt. When the fasteners are tightened, the first handlebar clamping bosses 871 and the second handlebar clamping bosses 876 can be drawn together such that the first handlebar clamping surfaces 860 and the second handlebar clamping surfaces 865 clamp to the handlebar of the bike.

The first mount 830 can include a first portion 831, a second portion 832, and a first handlebar surface 833. In FIG. 8, the first portion 831 is nested or hidden in the cavity 815 and the second portion 832 is exposed. The first portion 831 can include an extension portion 834, a mounting surface 835, a threaded hole 836, and a deployed clamping surface 837.

The second portion 832 can include a stem tube matching portion 881, and a hidden clamping surface 882. The stem tube matching portion 881 can be configured to match the contours of the stem body 810. For example, a surface of the stem tube matching portion 881 can flow into a surface of the stem body 810. The hidden clamping surface 882 can be configured to match or fit into the first mount clamping surface 817, partially or entirely. When the first mount 830 is in a hidden position, the second portion 832 is exposed.

The first handlebar surface 833 can be configured to match a surface of a handle bar in both the deployed position and the hidden position. When the first mount 830 is in a hidden position, the first handlebar surface 833 can be pressed against the handlebar by the first mount clamping surface 817 via the hidden clamping surface 882.

The second mount 840 can include a third portion 841, a fourth portion 842, and a second handlebar surface 843. In FIG. 8, the third portion 841 is nested or hidden in cavity 815 and the fourth portion 842 is exposed.

The third portion 841 can include a base portion 844, a pivoting portion 845, a pivot point 846, a mounting flange 847, and a deployed clamping surface 848. The base portion 844 and the pivoting portion 845 can be connected together by the pivot point 846. The pivot point 846 allows the pivoting portion 845 to be adjusted relative to the base portion 844. When the second mount 840 is in a hidden position, the third portion 841 can be stowed in the cavity 815.

The fourth portion 842 can include a stem tube matching portion 891, and a hidden clamping surface 892. The stem tube matching portion 891 can be configured to match the contours of the stem body 810. For example, a surface of the stem tube matching portion 891 can flow into a surface of the stem body 810. The hidden clamping surface 892 can be configured to match or fit into the second mount clamping surface 818, partially or entirely. When the second mount 840 is in a hidden position, the hidden clamping surface 892 can be mated with the second mount clamping surface 818. When the second mount 840 is in a hidden position, the fourth portion 842 is exposed.

The second handlebar surface 843 can be configured to match a surface of a handle bar in both the deployed position and the hidden position. When the second mount 840 is in a hidden position, the second handlebar surface 843 can be pressed against the handlebar by the second mount clamping surface 818 via the hidden clamping surface 892. The second mount 840 can be reconfigured from a deployed to a hidden position and vice versa.

Figure 9:
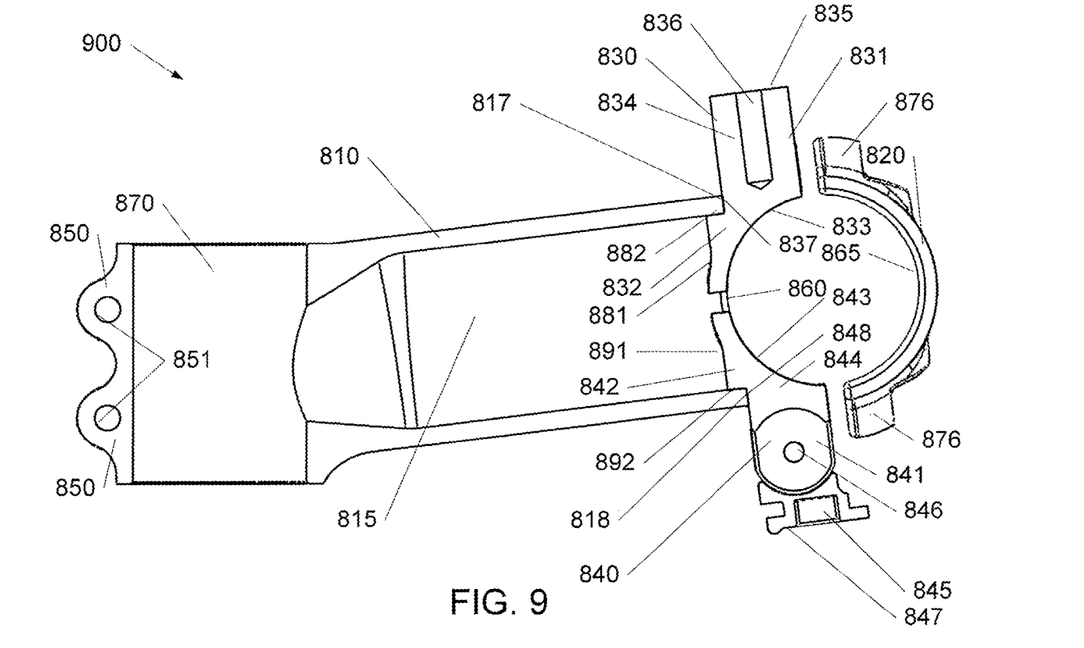
FIG. 9 is a side section view of the stem of FIG. 8 in a deployed configuration in accordance with an illustrative embodiment.

Referring to FIG. 9, a side section view of the stem of FIG. 8 in a deployed configuration 900 in accordance with an illustrative embodiment is shown. As described above, the stem 800 can include a stem body 810, faceplates 820, a first mount 830, and a second mount 840. The first mount 830 can include a first portion 831, a second portion 832, and a first handlebar surface 833. In FIG. 9, the first portion 831 is deployed and the second portion 832 is nested or hidden.

The first portion 831 can include an extension portion 834, a mounting surface 835, a threaded hole 836, and a deployed clamping surface 837. An accessory or accessory plate can be attached to the mounting surface 835. For example, a fastener in the threaded hole 836 can be used to secure an accessory plate to the mounting surface 835.

The deployed clamping surface 837 can be configured to match or fit into the first mount clamping surface 817, partially or entirely. When the first mount 830 is in a deployed position, the deployed clamping surface 837 can be mated with the first mount clamping surface 817.

The second portion 832 can include a stem tube matching portion 881, and a hidden clamping surface 882. When the first mount 830 is in a deployed position, the second portion 832 is nested.

The first handlebar surface 833 can be configured to match a surface of a handle bar in both the deployed position and the hidden position. When the first mount 830 is in a deployed position, the first handlebar surface 833 can be pressed against the handlebar by the first mount clamping surface 817 via the deployed clamping surface 837.

The second mount 840 can include a third portion 841, a fourth portion 842, and a second handlebar surface 843. In FIG. 9, the third portion 841 is deployed and the fourth portion 842 is hidden or nested.

The third portion 841 can include a base portion 844, a pivoting portion 845, a pivot point 846, a mounting flange 847, and a deployed clamping surface 848. An accessory, such as a light, can be attached to or slid over the mounting flange 847. For example, a light module with a cleat can be slid onto the mounting flange 847. The base portion 844 and the pivoting portion 845 can be connected together by the pivot point 846. The pivot point 846 allows the pivoting portion 845 to be adjusted relative to the base portion 844.

The deployed clamping surface 848 can be configured to match or fit into the second mount clamping surface 818, partially or entirely. When the second mount 840 is in a deployed position, the deployed clamping surface 848 can be mated with the second mount clamping surface 818.

The fourth portion 842 can include a stem tube matching portion 891, and a hidden clamping surface 892. When the second mount 840 is in a hidden position, the fourth portion 842 can be stowed in the cavity 815.

The second handlebar surface 843 can be configured to match a surface of a handle bar in both the deployed position and the hidden position. When the second mount 840 is in a deployed position, the second handlebar surface 843 can be pressed against the handlebar by the second mount clamping surface 818 via the deployed clamping surface 848. The second mount 840 can be reconfigured from a deployed to a hidden position and vice versa.

Figure 10:
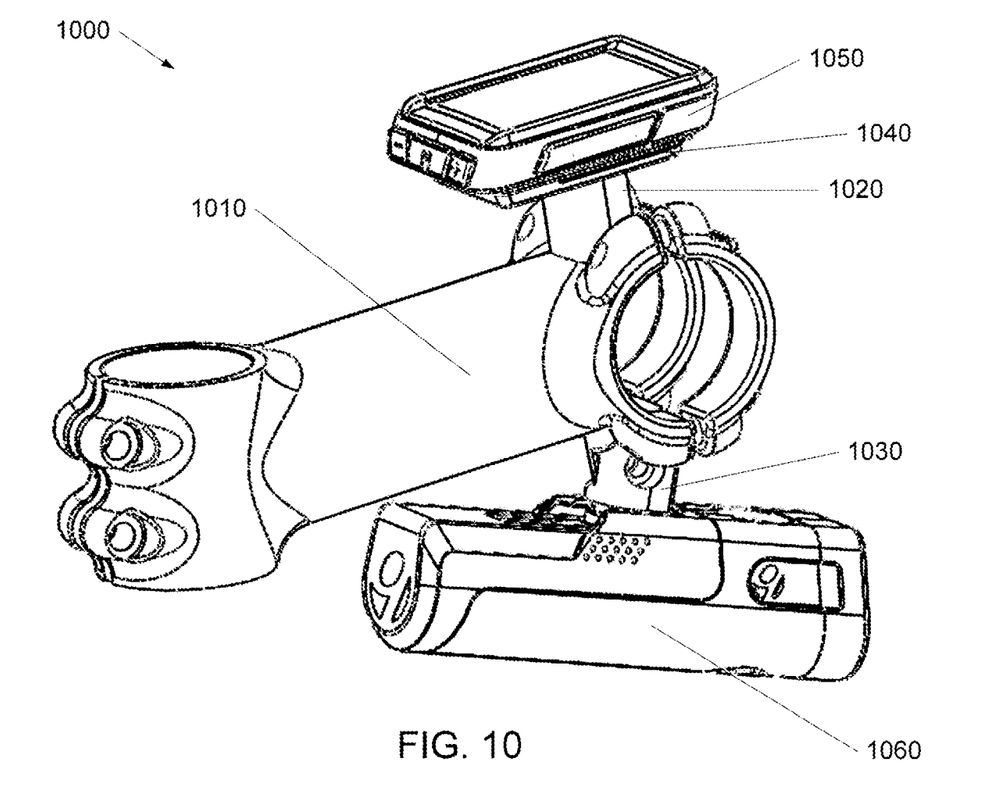
FIG. 10 is a perspective view of a stem with mounted accessories in accordance with an illustrative embodiment.

Referring to FIG. 10, a perspective view of a stem with mounted accessories 1000 in accordance with an illustrative embodiment is shown. The stem with mounted accessories 1000 can include a stem body 1010, a first mount 1020, a second mount 1030, an adapter 1040, a first accessory 1050, and a second accessory 1060. In FIG. 10, the first mount 1020 and the second mount 1030 are deployed.

The stem body 1010 can have a first mount 1020 extended and a second mount 1030 extended. An adapter 1040 can be fasted to the first mount 1020. A first accessory 1050 can clip in to the adapter 1040. The first accessory 1050 can be, for example, a bike computer.

The second mount 1030 can include a flange. The second accessory 1060 can include a cleat. The cleat of the second accessory 1060 can clip in to the flange of the second mount 1030.

The stem with mounted accessories 1000 can be secured to a bike steer tube and a handlebar. Advantageously, when the stem with mounted accessories 1000 is secured around the handlebar, the first mount 1020 and the second mount 1030 are secured.

Figure 12:
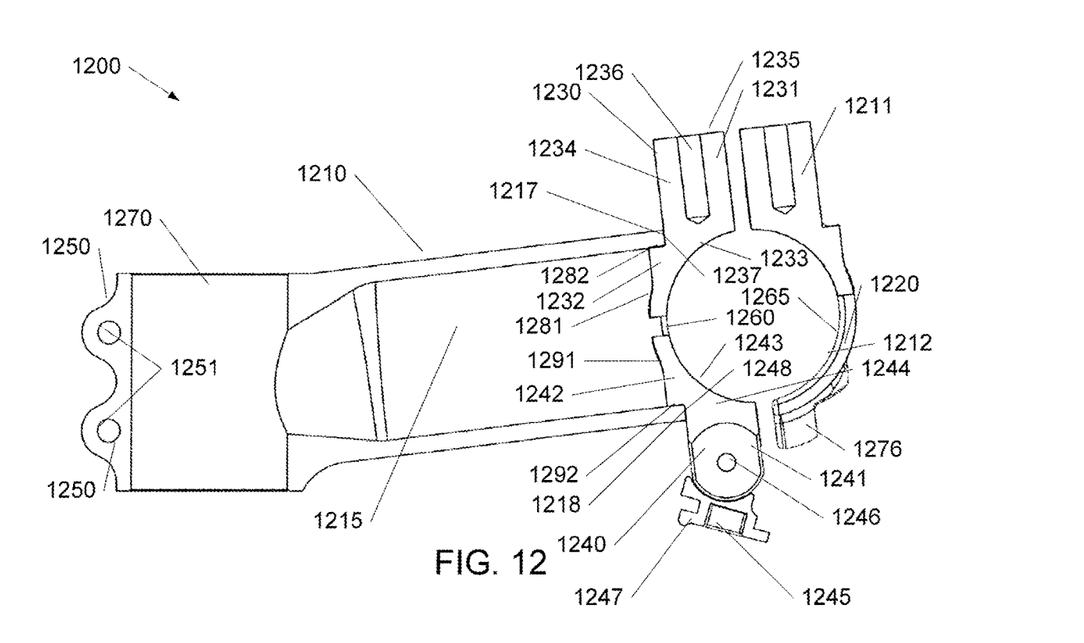
FIG. 12 is a side section view of a stem with three deployed mounts in accordance with an illustrative embodiment.

Referring to FIG. 12, a side section view of a stem 1200 with three deployed mounts in accordance with an illustrative embodiment is shown. As described above, the stem 1200 can include a stem body 1210, faceplates 1220, a first mount 1230, a second mount 1240, and a third mount 1211. The stem body 1210 can include a cavity 1215. The stem body 1210 can include a steering tube clamping surface 1270 and steer tube clamping bosses 1250 with holes 1251. The stem body 1210 can include a first mount clamping surface 1217 and a second mount clamping surface 1218. The faceplates 1220 can include a mount clamping surface 1212.

The stem body 1210 can include first handlebar clamping surfaces 1260 and first handlebar clamping bosses 1271. The faceplates 1220 can include second handlebar clamping surfaces 1265 and second handlebar clamping bosses 1276. The first handlebar clamping surfaces 1260 and the second handlebar clamping surfaces 1265 can be configured to clamp to a handlebar of a bike. The first handlebar clamping bosses 1271 and the second handlebar clamping surfaces 1265 can include holes for fasteners, for example, a bolt. When the fasteners are tightened, the first handlebar clamping bosses 1271 and the second handlebar clamping bosses 1276 can be drawn together such that the first handlebar clamping surfaces 1260 and the second handlebar clamping surfaces 1265 clamp to the handlebar of the bike.

The first mount 1230 can include a first portion 1231, a second portion 1232, and a first handlebar surface 1233. In FIG. 12, the first portion 1231 is nested or hidden in the cavity 1215 and the second portion 1232 is exposed. The first portion 1231 can include an extension portion 1234, a mounting surface 1235, a threaded hole 1236, and a deployed clamping surface 1237.

The second portion 1232 can include a stem tube matching portion 1281, and a hidden clamping surface 1282. The stem tube matching portion 1281 can be configured to match the contours of the stem body 1210. For example, a surface of the stem tube matching portion 1281 can flow into a surface of the stem body 1210. The hidden clamping surface 1282 can be configured to match or fit into the first mount clamping surface 1217, partially or entirely. When the first mount 1230 is in a hidden position, the second portion 1232 is exposed.

The first handlebar surface 1233 can be configured to match a surface of a handle bar in both the deployed position and the hidden position. When the first mount 1230 is in a hidden position, the first handlebar surface 1233 can be pressed against the handlebar by the first mount clamping surface 1217 via the hidden clamping surface 1282.

The second mount 1240 can include a third portion 1241, a fourth portion 1242, and a second handlebar surface 1243. In FIG. 12, the third portion 1241 is nested or hidden in cavity 1215 and the fourth portion 1242 is exposed.

The third portion 1241 can include a base portion 1244, a pivoting portion 1245, a pivot point 1246, a mounting flange 1247, and a deployed clamping surface 1248. The base portion 1244 and the pivoting portion 1245 can be connected together by the pivot point 1246. The pivot point 1246 allows the pivoting portion 1245 to be adjusted relative to the base portion 1244. When the second mount 1240 is in a hidden position, the third portion 1241 can be stowed in the cavity 1215.

The fourth portion 1242 can include a stem tube matching portion 1291, and a hidden clamping surface 1292. The stem tube matching portion 1291 can be configured to match the contours of the stem body 1210. For example, a surface of the stem tube matching portion 1291 can flow into a surface of the stem body 1210. The hidden clamping surface 1292 can be configured to match or fit into the second mount clamping surface 1218, partially or entirely. When the second mount 1240 is in a hidden position, the hidden clamping surface 1292 can be mated with the second mount clamping surface 1218. When the second mount 1240 is in a hidden position, the fourth portion 1242 is exposed.

The second handlebar surface 1243 can be configured to match a surface of a handle bar in both the deployed position and the hidden position. When the second mount 1240 is in a hidden position, the second handlebar surface 1243 can be pressed against the handlebar by the second mount clamping surface 1218 via the hidden clamping surface 1292. The second mount 1240 can be reconfigured from a deployed to a hidden position and vice versa.

The third mount 1211 can include a clamping surface configured to match the mount clamping surface 1212. Each of the faceplates 1220 can include the mount clamping surface 1212. The mount clamping surface 1212 can be smooth or include surfacing such as radial ridges, knurling, "gear teeth," or other friction-ous surfacing. The faceplates 1220 can compress the clamping surfaces of the third mount 1211 against a handlebar thereby pining the third mount 1211.

Figure 13:
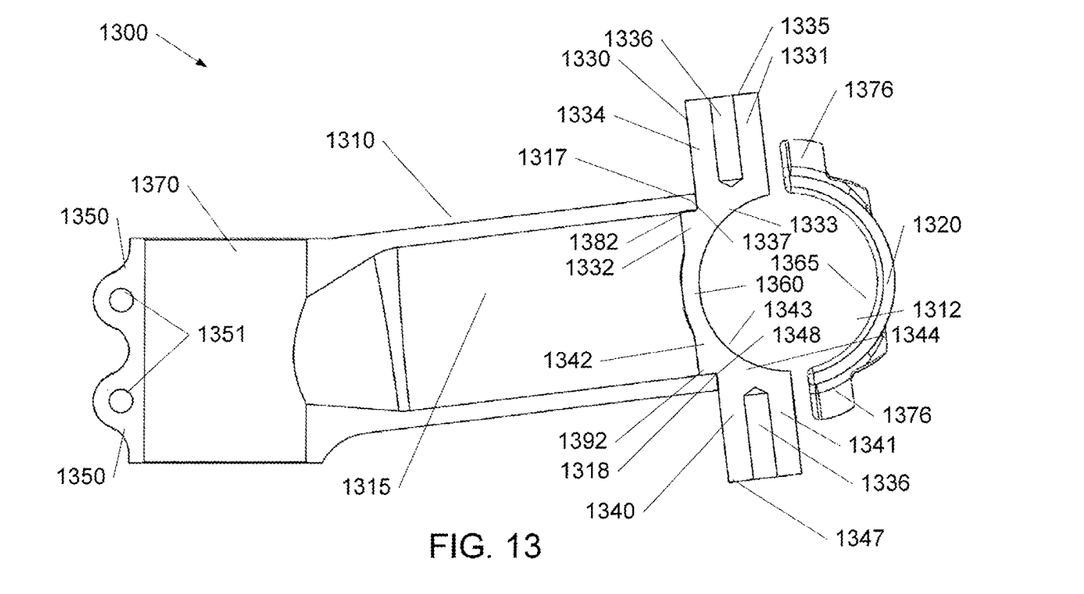
FIG. 13 is a side section view of a stem with a dual mount in accordance with an illustrative embodiment.

Referring to FIG. 13, a side section view of a stem 1300 with a dual mount in accordance with an illustrative embodiment is shown. As described above, the stem 1300 can include a stem body 1310, faceplates 1320, and a dual mount 1330. The stem body 1310 can include a cavity 1315. The stem body 1310 can include a steering tube clamping surface 1370 and steer tube clamping bosses 1350 with holes 1351. The stem body 1310 can include a first mount clamping surface 1317 and a second mount clamping surface 1318.

The stem body 1310 can include first handlebar clamping surfaces 1360 and first handlebar clamping bosses 1371. The faceplates 1320 can include second handlebar clamping surfaces 1365 and second handlebar clamping bosses 1376. The first handlebar clamping surfaces 1360 and the second handlebar clamping surfaces 1365 can be configured to clamp to a handlebar of a bike. The first handlebar clamping bosses 1371 and the second handlebar clamping surfaces 1365 can include holes for fasteners, for example, a bolt. When the fasteners are tightened, the first handlebar clamping bosses 1371 and the second handlebar clamping bosses 1376 can be drawn together such that the first handlebar clamping surfaces 1360 and the second handlebar clamping surfaces 1365 clamp to the handlebar of the bike.

The dual mount 1330 can include a first portion 1331, a second portion 1332, a first handlebar surface 1333, a third portion 1341, a fourth portion 1342, and a second handlebar surface 1343. The first portion 1331 can include an extension portion 1334, a mounting surface 1335, threaded holes 1336, and first clamping surfaces 1337, 1382. The third portion 1341 can include an extension portion 1340, a mounting surface 1347, threaded holes 1336, and second clamping surfaces 1348, 1392. The dual mount 1330 can extend from the top to the bottom of the stem body 1310. In another embodiment, the dual mount 1330 can extend beyond the top and the bottom of the stem body 1310.

The second portion 1332 can include a first stem tube clamping portion 1382 and a first mount clamping surface 1317. The first handlebar surface 1333 can be configured to match a surface of a handle bar. The first handlebar surface 1333 can be pressed against the handlebar by the first stem tube clamping portion 1382 and the first mount clamping surface 1317.

In an alternative embodiment, the dual mount 1330 can be compressed against a handlebar on the front side using the faceplates 1320. In another alternative embodiment, the dual mount 1330 can be compressed against a handlebar using a portion of the faceplates 1320 and a portion of the stem body.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the Waits, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A stem apparatus for a bicycle, comprising:
   a stem body that includes a cavity, a pair of handlebar clamping surfaces configured to clamp to a handlebar, and a mount clamping surface located between the pair of handlebar clamping surfaces; and
   a mount configured to be placed in a hidden position and a deployed position, wherein the mount includes:
      a mounting surface that in the hidden position is configured to nest in the cavity of the stem body, wherein the mounting surface extends outward from the pair of handlebar clamping surfaces to support a bicycle accessory in the deployed position; and
      a deployed clamping surface that is configured to mate with the mount clamping surface of the stem body in the deployed position, wherein the deployed clamping surface stows in the cavity of the stem body in the hidden position.

2. The stem apparatus of claim 1, wherein the mount further includes a stem tube matching portion configured to match a contour of the stem body in the hidden position.

3. The stem apparatus of claim 1, wherein the mount further includes a hidden clamping surface configured to mate with the mount clamping surface in the hidden position.

4. The stem apparatus of claim 3, wherein the hidden clamping surface is configured to stow in the cavity of the stem body in the deployed position.

5. The stem apparatus of claim 1, wherein the mount further includes a handlebar surface configured to match a surface of the handlebar in both the deployed position and the hidden position.

6. The stem apparatus of claim 5, wherein in the deployed position the handlebar surface is pressed against the handlebar by the stem body via the deployed clamping surface of the mount.

7. The stem apparatus of claim 5, wherein in the hidden position the handlebar surface is pressed against the handlebar by the stem body via a hidden clamping surface of the mount.

8. The stem apparatus of claim 1, wherein the mounting surface includes a threaded hole configured to receive a fastener to secure the bicycle accessory.

9. The stem apparatus of claim 1, wherein the mounting surface comprises a mounting flange.

10. The stem apparatus of claim 1, wherein the mount includes a base portion and a pivoting portion that pivots relative to the base portion.

11. The stem apparatus of claim 1, wherein the mount clamping surface is a first mount clamping surface, the mount is a first mount, the mounting surface is a first mounting surface that extends upward from the pair of handlebar clamping surfaces in the deployed position, and the bicycle accessory is a first bicycle accessory, and further comprising:
   a second mount clamping surface located between the pair of handlebar clamping surfaces; and
   a second mount with a second mounting surface that extends downward from the pair of handlebar clamping surfaces, wherein the second mounting surface is configured to support a second bicycle accessory.

12. The stem apparatus of claim 11, wherein the second mount is also configured to be placed in the hidden position and the deployed position.

13. The stem apparatus of claim 1, wherein the stem body has a bulk modulus greater than 50 gigapascals (GPa) and the mount has a bulk modulus less than 50 GPa.

14. The stem apparatus of claim 1, wherein the stem body comprises a first material, the mount comprises a second material, and the second material is more compressible than the first material.

15. A method of forming a stem apparatus for a bicycle, the method comprising:
   forming a stem body such that the stem body includes a cavity, a pair of handlebar clamping surfaces configured to clamp to a handlebar, and a mount clamping surface located between the pair of handlebar clamping surfaces; and
   forming a mount that is configurable between a hidden position and a deployed position, wherein the forming the mount comprises:
      forming a mounting surface on the mount that in the hidden position is configured to nest in the cavity of the stem body, and such that the mounting surface extends outward from the pair of handlebar clamping surfaces to support a bicycle accessory in the deployed position; and forming a deployed clamping surface on the mount that is configured to mate with the mount clamping surface of the stem body in the deployed position, and that is stowed in the cavity of the stem body in the hidden position.

16. The method of claim 15, further comprising forming, on the mount, a stem tube matching portion that is configured to match a contour of the stem body in the hidden position.

17. The method of claim 15, further comprising forming, on the mount, a hidden clamping surface configured to mate with the mount clamping surface in the hidden position.

18. The method of claim 15, further comprising forming, on the mount, a handlebar surface configured to match a surface of the handlebar in both the deployed position and the hidden position.

19. The method of claim 15, further comprising forming, on the mounting surface, a threaded hole configured to receive a fastener to secure the bicycle accessory.

20. The method of claim 15, further comprising forming the mount to include a base portion and a pivoting portion that pivots relative to the base portion.

* * * * *